United States Patent [19]

Kawabata et al.

[11] Patent Number: 4,562,491
[45] Date of Patent: Dec. 31, 1985

[54] MULTICHANNEL DIGITAL MAGNETIC RECORDING APPARATUS

[75] Inventors: Masaru Kawabata; Teruo Furukawa, both of Amagasaki; Michiyasu Ishibashi, Nagaokakyo, all of Japan

[73] Assignee: Mitsubishi Denki Kabushiki Kaisha, Tokyo, Japan

[21] Appl. No.: 475,407

[22] Filed: Mar. 15, 1983

[30] Foreign Application Priority Data

Mar. 26, 1982 [JP] Japan .................... 57-50611

[51] Int. Cl.³ .............................................. G11B 5/09
[52] U.S. Cl. ......................................... 360/51; 360/46; 360/63
[58] Field of Search ............... 360/51, 115, 63, 22, 360/23, 24

[56] References Cited

U.S. PATENT DOCUMENTS

| 12,264 | 12/1878 | Lewkowicz | 360/63 |
| 3,199,094 | 8/1965 | Bakshi | 360/51 |
| 3,975,764 | 8/1976 | Kobayashi et al. | 360/23 |
| 4,437,128 | 3/1984 | Sapkowski | 360/22 |

FOREIGN PATENT DOCUMENTS

| 1208549 | 2/1960 | France | 360/22 |
| 0057811 | 5/1977 | Japan | 360/51 |

*Primary Examiner*—Raymond F. Cardillo, Jr.
*Assistant Examiner*—Alyssa H. Bowler
*Attorney, Agent, or Firm*—Lowe, King, Price & Becker

[57] ABSTRACT

A multichannel digital magnetic recording apparatus comprises a plurality (N) of modulating circuits (41 to 4N) and timing circuits (51 to 5N). Digital signals (Z1 to ZN) undergo modulation in the modulating circuits in accordance with a modulation system of a detection window Tw. The modulated signals (A1 to AN) are converted into pulse current trains by the timing circuits and then delayed such that the respective pulse currents do not occur simultaneously. Accordingly, a power capacity required of a voltage source for writing the signals by means of thin film magnetic heads (71 to 7N) is considerably decreased.

17 Claims, 7 Drawing Figures

MULTICHANNEL DIGITAL MAGNETIC RECORDING APPARATUS

BACKGROUND OF THE INVENTION

1. Field of the Invention

The present invention relates to a multichannel digital magnetic recording apparatus. More specifically, the present invention relates to a multichannel magnetic recording apparatus for writing digital signals on a magnetic recording medium in multichannels using thin film magnetic heads.

2. Description of the Prior Art

Since a thin film magnetic head includes a lesser number of turns as compared with a winding type magnetic head, a writing current as large as several amperes is required in writing data in a magnetic recording medium such as a magnetic tape, magnetic disk, magnetic drum or the like using the same. However, when such a large writing current flows into a thin film magnetic head, such a thin film magnetic head may suffer thermal damage. Therefore, conventionally the following approach was employed to prevent the above described thermal damage.

FIG. 1 is a graph showing a waveform of a current flowing through a winding of a thin film magnetic head of a conventional apparatus. An ordinary rectangular waveform recording current IR is converted into a recording current IP of a pulse train form to avoid thermal damage. A peak value of the recording current IR is Io and the minimum inversion interval is Tmin. The peak value of the recording current IP is likewise Io and the period of the pulse train is T and the pulse width of the pulse train is $\Delta T$. It is known that assuming that the gap length of the magnetic head is $G_l$, the relative speed of the magnetic head and the recording medium is V and the period T of the pulse train is selected to satisfy the following formula, magnetization patterns on a recording medium when recorded by the recording current IR and when recorded by the recording current IP are equivalent to each other and the same outputs are obtained as the outputs from reproducing heads.

$$T \leq \frac{G_l + V \cdot \Delta T}{V} \quad (1)$$

Since the heat of the winding of the magnetic head is proportional to the square of a current flowing through the winding, assuming the period T=Tmin/2, for example, the heat amount of the winding decreases in proportion to $(2 \cdot \Delta T/T)^2$ as the pulse width $\Delta T$ is decreased with respect to the period T.

However, in the case where signals are written on a recording medium in multichannels by means of a plurality (N) of thin film magnetic heads, it is necessary that the current capacity of a power source for the apparatus is increased N times as compared with a case of a single channel. In addition, since thin film magnetic heads have a smaller number of turns and require an increased amount of current, it follows that a power supply capacity required by an apparatus becomes considerably large. Accordingly, it has been desired that an apparatus capable of reducing a power supply capacity is provided in the case of multichannels.

SUMMARY OF THE INVENTION

In summary, the present invention comprises a multichannel digital magnetic recording apparatus adapted for writing digital signals in multichannels in a magnetic recording medium having a traveling speed V, comprising: a plurality (N) of thin film magnetic heads having a gap length $G_l$ for writing signals on a recording medium, a plurality (N) of modulating means for modulating the digital signals in a modulation system of a detection window Tw for providing modulated signals, and a plurality (N) of timing means for converting the modulated signals into pulse current trains having a pulse width of $\Delta T$ and a period of T and for delaying the pulse current trains by 0, T/K, 2T/K, 3T/K, . . . , (K−1)T/K for supplying the same to the thin film magnetic heads, where the period T satisfies the following formula, where M is an integer satisfying $M \geq 1$, and K is an integer satisfying $2 \leq K \leq N$.

$$T = \frac{Tw}{M} = \frac{G_l + V \cdot \Delta T}{V} \quad (2)$$

According to the present invention, the digital signals undergo modulation in a modulation system of the detection window Tw, whereby the same is converted into pulse current trains, whereupon the respective pulse currents are delayed so that the same may not occur simultaneously. Accordingly, the timings of the pulse current being supplied to the respective thin film magnetic heads are not consistent with each other and, therefore, it was confirmed that even in the case of multichannels the current capacity of a power supply required for writing the signals may be that for a single channel.

An object of the present invention is to provide a multichannel digital magnetic recording apparatus capable of reducing a power supply capacity for writing in the case where signals are written on a recording medium in multichannels by means of a plurality of thin film magnetic heads.

A principal advantage of the present invention is that a power supply capacity for writing signals on a recording medium may be the same as that required for only one channel in spite of recording in multichannels.

Another advantage of the present invention is that since a writing current of a thin film magnetic head is as large as several amperes the fact that the power supply capacity may be reduced to that required for one channel makes it possible to implement an apparatus in a small size and to drastically reduce a cost of the apparatus.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a graph showing waveforms of electrical signals at various portions in the case of;

$$\frac{G_l + V \cdot \Delta T}{V} \geqq T_w;$$

Figure 5:
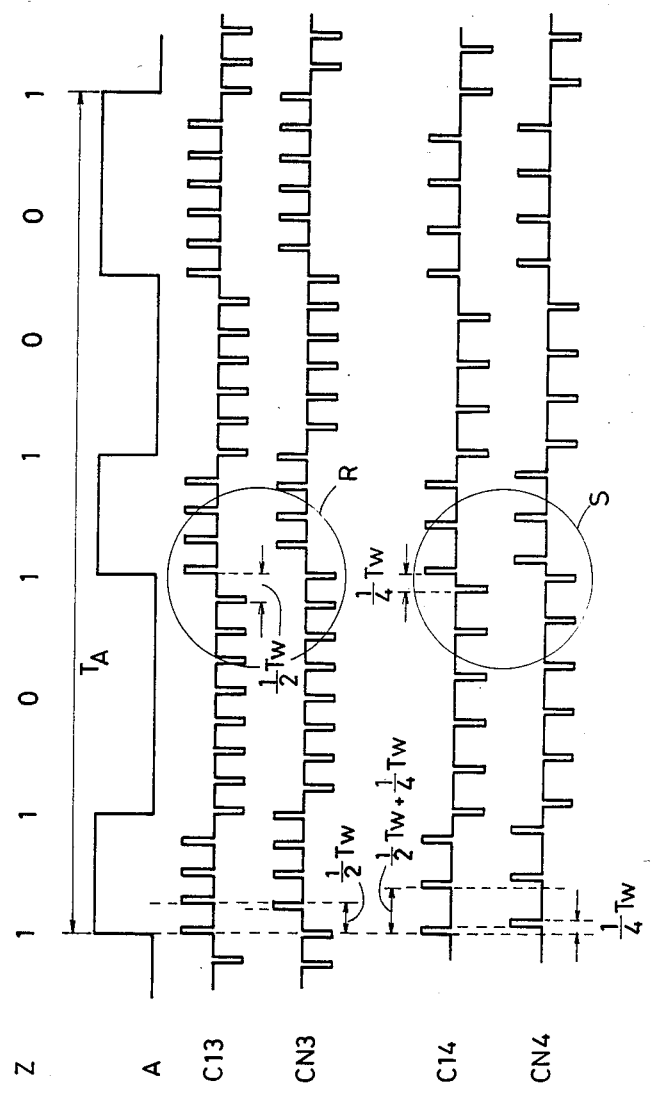

FIG. 5 is a graph showing waveforms of electrical signals in the, case of $$\frac{G_l + V \cdot \Delta T}{V} < T_w;$$

Figure 1:
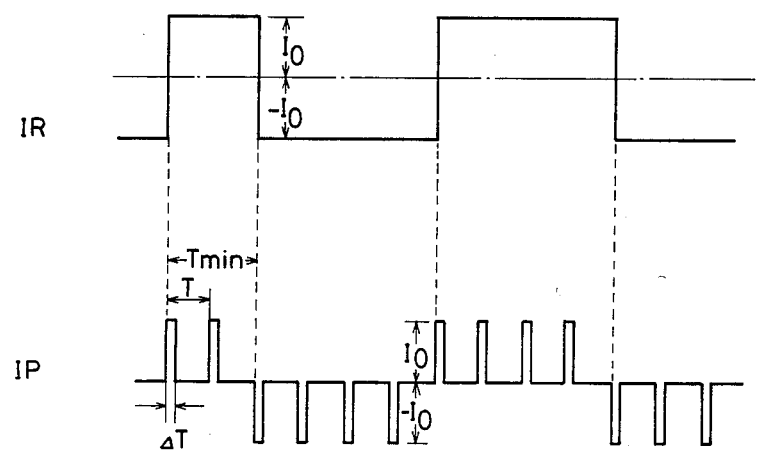
FIG. 1 is a graph showing a waveform of a current flowing in the winding of a thin film magnetic head of a conventional apparatus.
Figure 2:
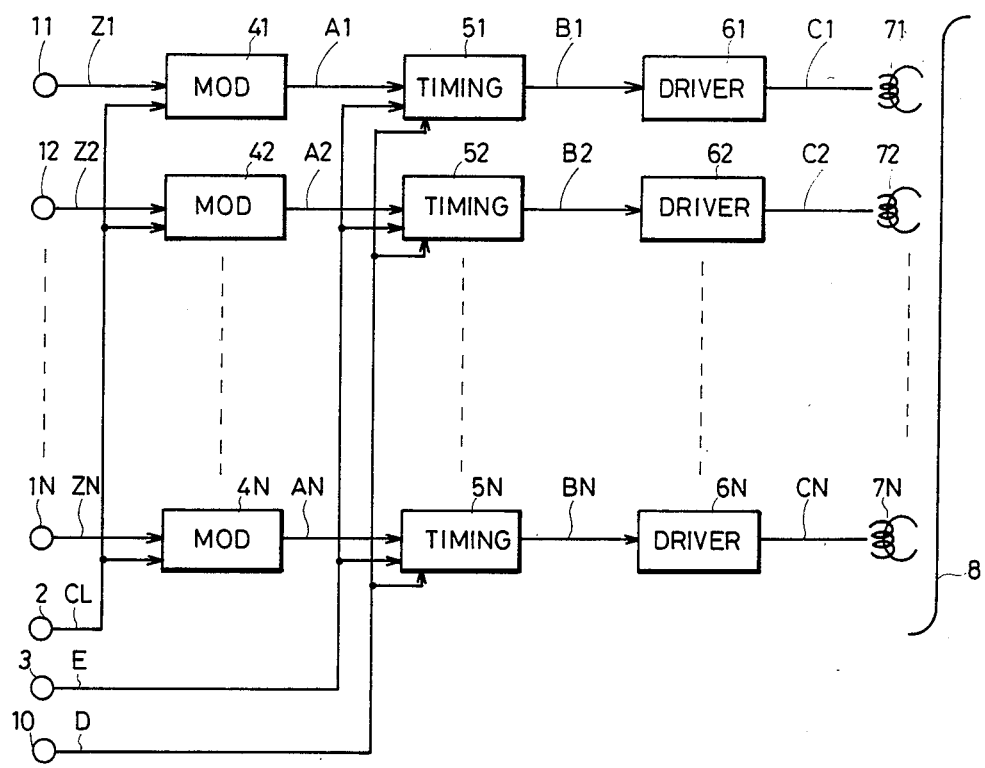
FIG. 2 is a block diagram of one embodiment of the present invention.
Figure 6:
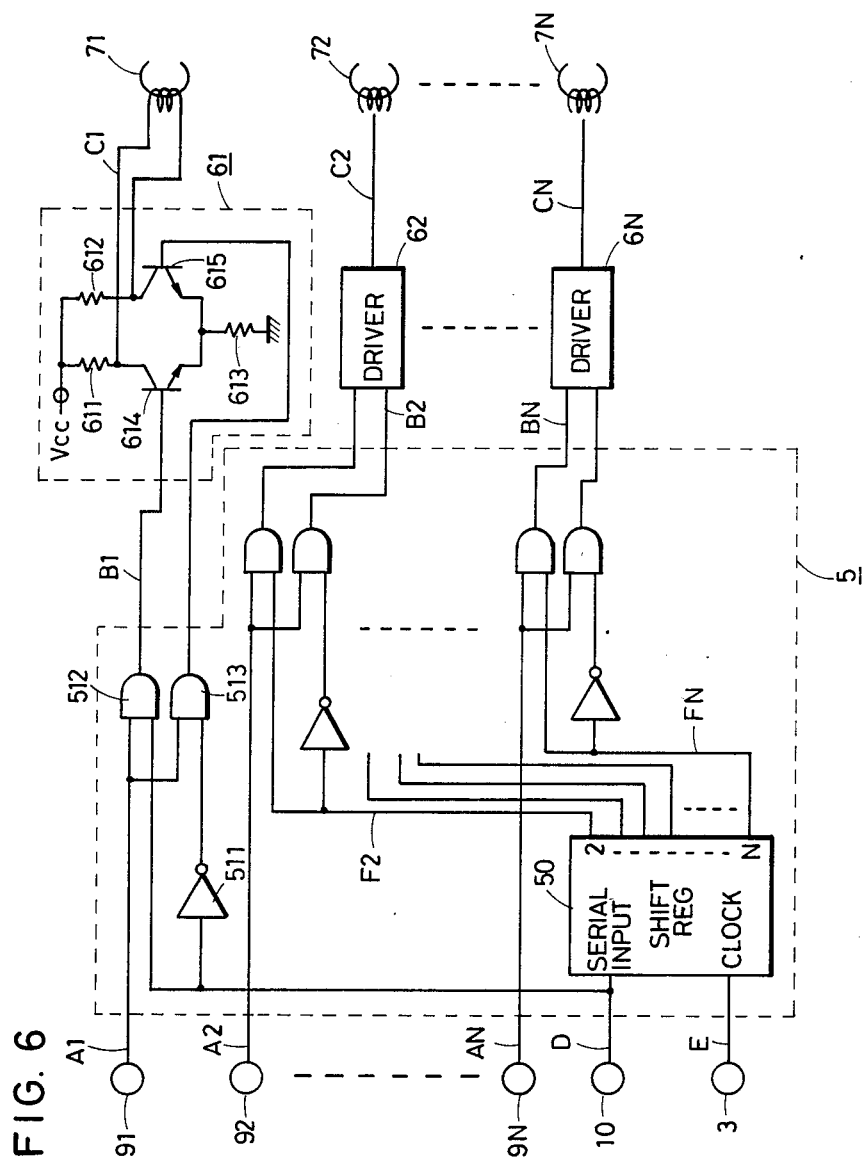
Figure 7:
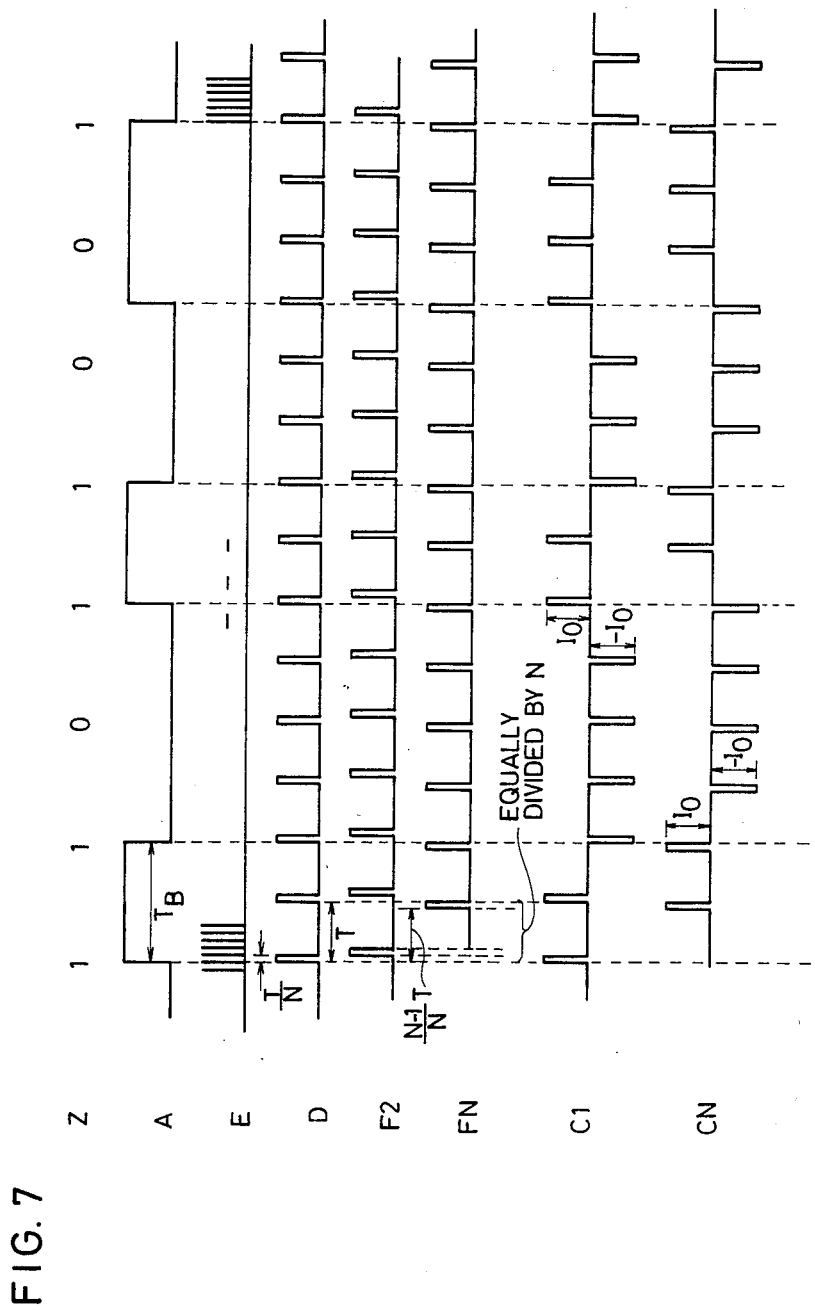

FIG. 6 is a block diagram showing in detail the timing circuits and the driver circuits shown in FIG. 2; and FIG. 7 is a graph showing waveforms of electrical signals at various portions in the diagram shown in FIG. 6.

DESCRIPTION OF THE PREFERRED EMBODIMENTS

FIG. 2 is a block diagram showing one embodiment of the present invention. The embodiment shown comprises a plurality (N) of modulating circuits 41 to 4N, a plurality (N) of timing circuits 51 to 5N, a plurality (N) of driver circuits 61 to 6N and a plurality (N) of thin film magnetic heads 71 to 7N. Input terminals 11 to 1N and 2 are coupled to input portions of the modulating circuits 41 to 4N, respectively, and the output portions of the modulating circuits 41 to 4N are coupled to the input portions of the timing circuits 51 to 5N, respectively. The input terminals 3 and 10 are coupled to the input portions of the timing circuits 51 to 5N. The output portions of the timing circuits 51 to 5N are coupled to the input portions of the driver circuits 61 to 6N, respectively, and the output portions of the driver circuits 61 to 6N are coupled to the thin film magnetic heads 71 to 7N, respectively. A magnetic tape 8 is caused to travel in the vicinity of the thin film magnetic heads 71 to 7N.

Digital data Z1 to ZN are supplied to the input terminals 11 to 1N, respectively, so that these data may be supplied to the modulating circuits 41 to 4N, respectively. A clock CL is supplied to the input terminal 2 so that the clock may be supplied to the modulating circuits 41 to 4N. A shift clock E is supplied to the input terminal 3 so that the shift clock may be supplied to the timing circuits 51 to 5N. A pulse train D is supplied to the input terminal 10 so that the pulse train may also be supplied to the timing circuits 51 to 5N. The modulating circuits 41 to 4N modulate the data Z1 to ZN, respectively, in accordance with a modulation system of a detection window Tw, so that the modulated signals A1 to AN, respectively, may be obtained. The timing circuits 51 to 5N convert the modulated signals A1 to AN to a pulse form as a function of the pulse train D. The shift clock E and the pulse shaped signals are delayed by 0, T/K, 2T/K, 3T/K, . . . , (K−1)T/K, respectively, whereby the delayed signals B1 to BN, respectively, are obtained, where T is a period of the pulse, and K is an integer satisfying $2 \leqq K \leqq N$. The driver circuits 61 to 6N comprise recording amplifiers serving to amplify the delayed signal B1 to BN to provide writing currents C1 to CN, respectively. Thin film magnetic heads 71 to 7N form N magnetic patterns on the magnetic tape 8 by the writing currents C1 to CN. As a result, the magnetic patterns for N channels are formed on the magnetic tape 8. Meanwhile, the details of the timing circuits 51 to 5N and the driver circuits 61 to 6N will be described subsequently with reference to FIGS. 6 and 7.

Figure 3:
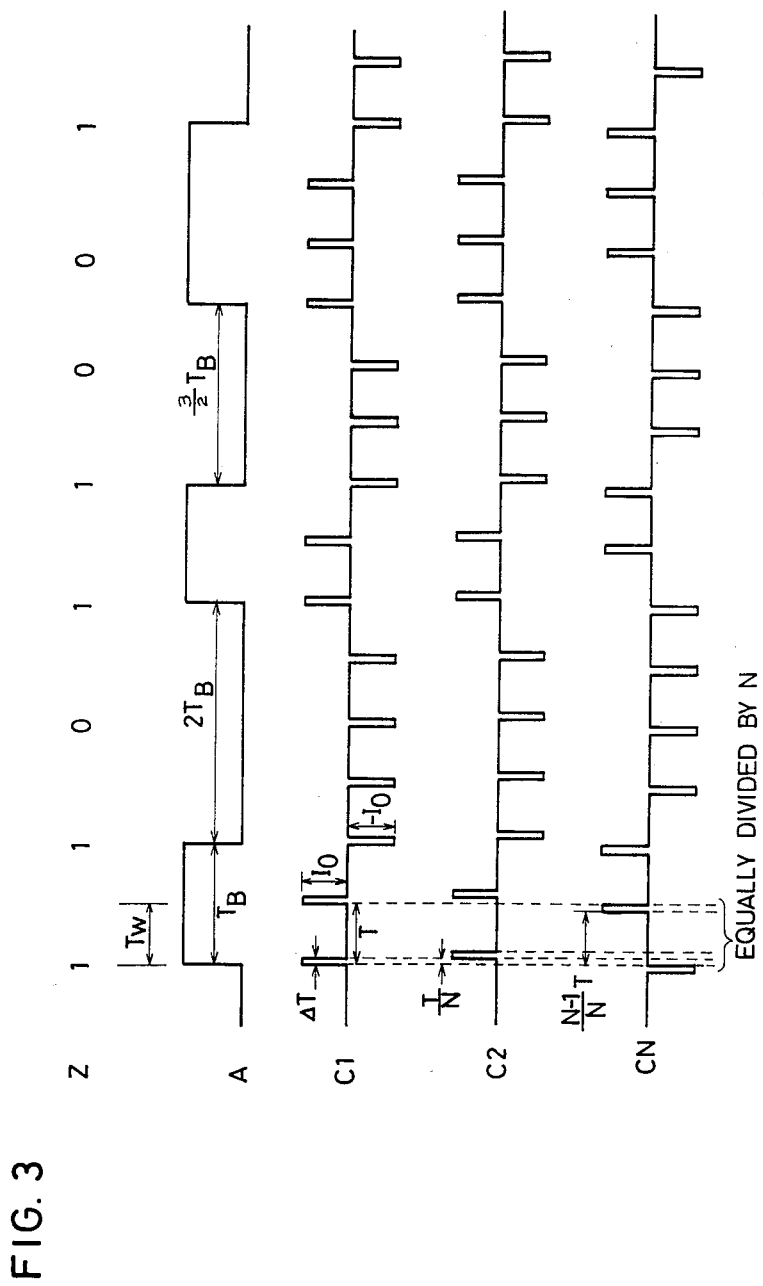
FIG. 3 is a graph showing waveforms of electrical signals at various portions in the diagram shown in FIG. 2.

Now an outline of an overall operation of the embodiment shown in FIG. 2 will be described with reference to FIG. 3. FIG. 3 is a graph showing waveforms of electrical signals at various portions in the diagram shown in FIG. 2. Now consider a case where an MFM (modified frequency modulation) modulating system is employed as a modulation system of the modulating circuits 41 to 4N and the same data Z is simultaneously supplied to the modulating circuits 41 to 4N. For simplicity of description, it is assumed that K in the delay time is K=N, where N is a positive integer.

If the data Z is supplied simultaneously to the modulating circuits 41 to 4N, an MFM modulated signal A as shown in FIG. 3(A) is obtained from the modulating circuits 41 to 4N. It is well known that assuming that a bit cell of the data Z is $T_B$ three kinds of time intervals of $T_B$, $3T_B/2$, $2T_B$ appear in the modulated signal A. Accordingly, the detection window Tw of the MFM modulation system becomes $Tw=T_B/2$. The timing circuits 51 to 5N convert the modulated signal A to a pulse signal having a peak value $I_0$ and a pulse width $\Delta T$ and the pulse signal is then delayed by 0, T/N, 2T/N, . . . (N−1)T/N, respectively. Accordingly, when the modulated signal A is supplied simultaneously to the timing circuits 51 to 5N, the writing current C1 to CN obtained from the driver circuits 61 to 6N, respectively, become as shown in FIG. 3.

As is clear from the FIG. 3, since the timings of the writing currents C1 to CN supplied to the thin film magnetic heads 71 to 7N do not coincide with each other under a particular condition, the current capacity of the power source for writing may be $2I_0$. The same applies also in the case where the same data is supplied simultaneously to the respective channels and the current capacity of the power source does not exceed $2I_0$ in any case. More specifically, even in the case of multi-channels, the current capacity of the power source required for writing signals may be that for one channel.

Now description will be made in the following of the condition for avoiding overlapping of the writing currents C1 to CN flowing in the respective thin film magnetic heads 71 to 7N in the case where a modulation system of the detection window Tw is employed. It is a matter of course that a period of T of a writing current converted in a pulse form of a pulse width $\Delta T$ is assumed to satisfy the above described formula (1). In order that the writing currents C1 to CN flowing into the respective thin film magnetic heads 71 to 7N may not overlap each other, it is necessary to select the maximum delay time Tmax of a delay amount of the respective timing circuits 51 to 5N to be Tmax<Tw, as is clear from FIG. 3. Since the pulse width $\Delta T$ of the writing current is a limited value, it is necessary to select Tmax to be as large as possible, in the case where the recording channel number N is large.

Now a condition to make the maximum delay time Tmax be as large as possible is considered. In this case, this is considered for each of a case of $$\frac{G_l + V \cdot \Delta T}{V} \geqq T_w$$

and a case of $$\frac{G_l + V \cdot \Delta T}{V} < Tw.$$

In Case of $\frac{G_l + V \cdot \Delta T}{V} \geq Tw.$     I

Figure 4:
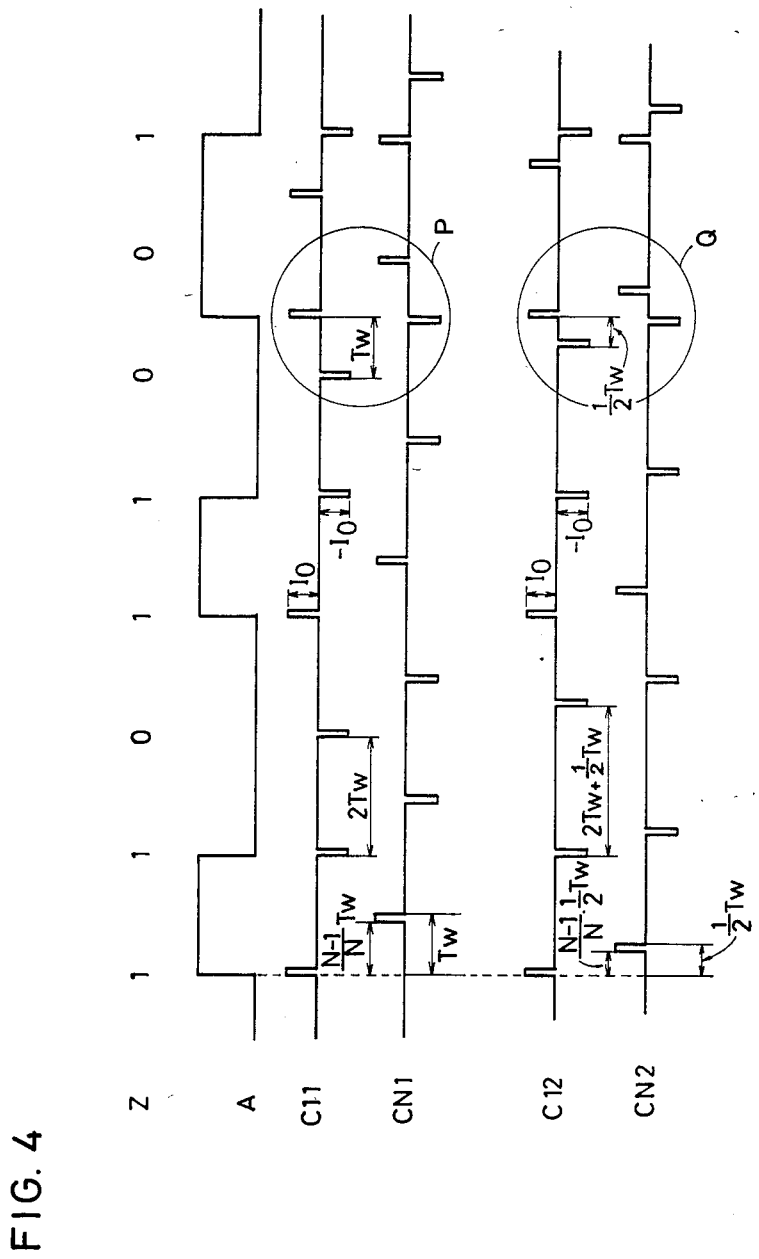

Assuming that an MFM modulation system is employed in the embodiment shown in FIG. 2 and the data Z is supplied simultaneously to the modulating circuits 41 to 4N, a case where a period T of a writing current pulse is T=2Tw and a case where a period T of the same is T=2Tw+Tw/2 are considered. However, in this case $$2T_2 + Tw/2 \leq \frac{G_l + V \cdot \Delta T}{V}$$

is assumed. FIG. 4 is a graph showing waveforms of electrical signals at various portions in the above described two cases. Referring to the figure, Z shows the applied data, and A shows the MFM modulated signal obtained from the modulating circuits 41 to 4N.

In the case of T=2Tw, the timing circuits 51 to 5N delay the supplied modulated signal A in succession by 0 or Tw/N to provide the delayed outputs. Accordingly, the writing currents C11 and CN1 become as shown in FIG. 4.

In the case of T=2Tw+Tw/2, the timing circuits 51 to 5N delay the supplied modulated signal A in succession by 0 or (1/N)·(Tw/2) to provide the delayed outputs. Accordingly, the writing currents C12 and CN2 in this case become as shown in FIG. 4.

As is understood from FIG. 4, the maximum delay time Tmax of the timing circuit in the case of T=2Tw is Tmax<Tw (see the P portion in FIG. 4), whereas in the case of T=2Tw+Tw/2 the maximum delay time Tmax<Tw/2 (see the Q portion in FIG. 4). If and when the pulse width of the writing current in each of the case of T=2Tw and the case of T=2Tw+Tw/2 is equal to each other, a total consumption power in the thin film magnetic heads 71 to 7N and a heat amount in the windings do not exhibit any change in both cases, as is readily understood, inasmuch as the total number of the pulses supplied to all the heads is the same. Generally, driving of the thin film magnetic heads 71 to 7N is performed by transistors and the pulse width of the writing current is limited by the switching rate and the storage time of the transistors to be used for that purpose. Accordingly, when the maximum delay time Tmax of the timing circuit is larger and, in addition, since there is no difference in the consumption power and the heat amount, as described previously, it is more advantageous to employ T=2Tw than to employ T=2Tw+Tw/2. In general, if and when a modulation system of a detection window Tw is employed, in the case of $$\frac{G_l + V \cdot \Delta T}{V} \geq Tw,$$

it is effective to set a period T so as to satisfy the following formula:

$$T = M_1 \cdot Tw \leq \frac{G_l + V \cdot \Delta T}{V} \quad (3)$$

where $M_1$ is a maximum integer which satisfies the above described formula (3).

In Case of $\frac{G_l + V \cdot \Delta T}{V} < Tw.$     II

Assuming that an MFM modulation system is employed in the embodiment shown in FIG. 2 and the data Z is simultaneously supplied to the modulating circuits 41 to 4N, a case of T=Tw/2 and a case of T=Tw/2+Tw/4 will be considered. FIG. 5 is a graph showing waveforms of electrical signals at various portions in these cases. Referring to the figure, Z shows the applied data and A shows an MFM modulated signal obtained from the modulating circuits 41 to 4N.

In the case of T=Tw/2, the timing circuits 51 to 5N delay the supplied modulated signal A in succession by 0 or (1/N)·(Tw/2) to provide the delayed outputs. Accordingly, the writing currents C13 and CN3 in this case become as shown in FIG. 5.

In the case of T=Tw/2+Tw/4, the timing circuits 51 to 5N delay the supplied modulated signal A in succession by 0 or (1/N)·(Tw/4) to provide the delayed outputs. Accordingly, the writing currents C14 and CN4 in this case become as shown in FIG. 5.

As is understood from FIG. 5, in the case of T=Tw/2, the maximum delay time Tmax of the timing circuits is Tmax<Tw/2 (see the R portion in FIG. 5), whereas in the case of T=Tw/2+Tw/4, the maximum delay time Tmax becomes Tmax<Tw/4 (see the S portion in FIG. 5). Furthermore, in the case where the pulse width of the writing current in each of the case of T=Tw/2 and the case of T=Tw/2+Tw/4 is equal to each other, the pulse number during the time period $T_A$ in FIG. 5 is 28 and 20 for each, but the difference in the consumption power in the thin film magnetic heads 71 to 7N and the heat amount in the windings in both cases has no significance. The reason is that as compared with an effect of reducing the consumption power and the heat amount in the magnetic heads by pulse current recording in comparison with ordinary rectangular waveform current recording, the difference in the consumption power and the heat amount due to the above described difference in the pulse number is small. Accordingly, it is more advantageous to employ T=Tw/2 than to employ T=Tw/2+Tw/4. In general, in the case where a modulation system of a detection window Tw is employed and in the case of $$\frac{G_l + V \cdot \Delta T}{V} < Tw,$$

as for the case of T=Tw/$M_2$ ($M_2$ is an integer satisfying $2 \leq M_2$) and the case of $T = Tw/M_2 + \beta$ where $0 < \beta < Tw/(M_2-1) - Tw/M_2$, the former maximum delay time Tmax is Tmax<Tw/$M_2$, whereas the latter maximum delay time Tmax is Tmax<(Tw/$M_2$)−$\beta$. In addition, even in the case where the maximum inversion period of the modulation system is infinite, the former consumption power and the latter consumption power are in a relation shown by the following equation and therefore a difference in the consumption power and the heat amount between both is small.

$$\frac{\text{consumption power of the latter}}{\text{consumption power of the former}} < \frac{\frac{1}{M_2}Tw + \beta}{\frac{1}{M_2}Tw} \quad (4)$$

Accordingly, it is effective to set a period T so as to satisfy the following formula:

$$T = \frac{1}{M_2}Tw \leq \frac{G_l + V \cdot \Delta T}{V} \quad (5)$$

where $M_2$ is an integer satisfying $2 \leq M_2$ and is the minimum satisfying the above described formula (5).

Now a description will be made of the details of the timing circuits 51 to 5N and the driver circuits 61 to 6N shown in FIG. 2. FIG. 6 is a block diagram showing the details of the timing circuits and the driver circuits shown in FIG. 2. In the embodiment shown, the above described timing circuits 51 to 5N are included in the grouped timing circuit 5. The timing circuit 5 comprises a single shift register 50 and a plurality (N) of gate circuits. Each of the gate circuits comprises two AND gates (such as AND gates 512 and 513) and one inverter (such as an inverter 511). The input terminals 91 to 9N are coupled to the modulating circuits 41 to 4N, respectively, shown in FIG. 2 so that the modulated signals A1 to AN are supplied thereto, respectively. The shift register 50 is of a serial in-parallel out type and the serial input portion is supplied with a pulse train D of a pulse width $\Delta T$ and period T. The clock input portion of the shift register 50 is supplied with a shift clock E. One gate circuit is connected to the serial input portion of the shift register 50 and a plurality (N − 1) of gate circuits are connected to the parallel output portion. The driver circuits 61 to 6N each comprises two transistors (such as transistors 614 and 615). The bases of these transistors are connected to the AND gates in the respective gate circuits and the collectors of these transistors are connected to the thin film magnetic heads.

The operation of the circuit shown in FIG. 6 will be described with reference to FIG. 7, which is a graph showing waveforms of electrical signals at various portions in the circuit shown in FIG. 6. In this case, as in the case of the diagram shown in FIG. 3, consideration is given to a case where an MFM modulation system is employed and the data Z is simultaneously supplied to the modulating circuits 41 to 4N. Meanwhile, for simplicity of description, it is assumed that K=N. At that time, the same modulated signal A is supplied to the input terminals 91 to 9N. The shift clock E is supplied to the input terminal 3 to provide a delay time. The shift clock E is a successive pulse train having a period T/N. The input terminal 10 is supplied with a pulse train D having a pulse width $\Delta T = T/N$ and a period $T = Tw = T_B/2$. When the serial input portion of the shift register 50 is supplied with the pulse train D from the input terminal 10, the outputs F2 to FN as delayed by T/N by the shift clock E are obtained from the parallel output portion. In the gate circuit the modulated signal A is gated by the pulse train D or the outputs F2 to FN obtained from the shift register 50. The outputs from the gate circuits are supplied to the bases of the two transistors in the driver circuits. The peak value $I_0$ of the writing current C1 flowing into the thin film magnetic head 71 is determined by the source voltage Vcc in the driver circuit 61, the resistance values of the resistors 611 and 612 and the winding resistance of the thin film magnetic head 71. The polarity of the writing current C1 is determined by which one of transistors 614 or 615 is in an on state. The same applies to the other driver circuits 62 to 6N. Thus, the writing currents C1 to CN flow into the thin film magnetic heads 71 to 7N.

As is clear from FIGS. 6 and 7, since the pulse trains of the writing currents flowing into the thin film magnetic heads 71 to 7N are successive pulse trains of a single period, even if the polarity could be inverted, it is possible to prepare such delay signals using a simple circuit employing a shift register, an inverter and AND gates. Furthermore, with the circuits shown in FIG. 6, it is not necessary to delay in advance the modulated signals A1 to AN before the same enter into this circuit. Conversely, the pulse train in the writing currents C11, CN1, C12 and CN2 shown in FIG. 4 and the writing currents C13, CN3, C14 and CN4 shown in FIG. 5 is not of a single period, it is necessary to prepare such pulse trains so as to correspond to the modulated signals and it would be readily understood that any circuits for that purpose would become complicated.

Although the foregoing description was made in conjunction with the case where an MFM modulation system is employed as a modulation system, the same applies also to a case where any other modulation system such, as a 3PM (three-position modulation) modulation system is employed. Furthermore, although in the foregoing description a delay time was given by equally dividing Tw or $Tw/M_2$ by the number N with respect to multichannel recording of N channels, the driver circuits undergo restriction to the pulse width of a writing current due to a storage time and the like of transistors themselves, for example, which does not necessarily makes it possible to equally divide by N in an ideal manner. In such a case, Tw or $Tw/M_2$ may be divided equally by L in accordance with a necessary pulse width, where L is a positive integer which satisfies L<N. Even in such a case, a power source capacity required for writing the signals can be reduced as a matter of course.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multichannel digital magnetic recording apparatus for writing multichannel digital signals in multichannels on a magnetic recording medium traveling at a traveling speed V, the written digital signal in each channel represented by a train of current pulse elements having a pulse width $\Delta T$ and a period T, comprising:
   a plurality (N) of thin film magnetic heads each having a gap length $G_l$ for writing signals in said recording medium,
   a power supply for said heads, and
   means for reducing power requirements from said power supply, including:
   a plurality (N) of modulating means for modulating said digital signals in accordance with a modulation system of a detection window Tw to provide modulated signals in the form of pulses,
   a plurality (N) of input means for providing said multichannel digital signals to respective ones of said modulating means, and a plurality (N) of timing means coupled to said modulating means and to said thin film magnetic heads, respectively, for converting each of said modulated multichannel signals in the form of pulses into said trains of current pulse elements having a pulse width ΔT and a period T, for delying said current pulse elements by 0, T/K, 2T/K, 3T/K, . . . , (K−1)T/K, and for providing the delayed outputs to said thin film magnetic heads, where said period T satisfies the following formula in which M is an integer satifying M≧1, and K is an integer satifying 2≦K≦N:

$$T = \frac{T_w}{M} \leq \frac{G_1 + V \cdot \Delta T}{V}$$

2. A multichannel digital magnetic recording apparatus in accordance with claim 1, wherein said plurality (N) of timing means comprise
   a single shift register means receiving a pulse train having a pulse width ΔT and a period T and a shift clock signal having a period T/K, and
   a plurality (N) of gate means coupled to said shift register means for gating said modulated signals to said magnetic heads, respectively.

3. A multichannel digital magnetic recording apparatus in accordance with claim 1, which further comprises
   a plurality (N) of driver means coupled between said timing means and said thin film magnetic heads for amplifying the outputs from said timing means, respectively.

4. A multichannel digital magnetic recording apparatus in accordance with claim 2, which further comprises
   a plurality (N) of driver means coupled between said timing means and said thin film magnetic heads for amplifying the outputs from said timing means, respectively.

5. A multichannel digital magnetic recording apparatus as recited in claim 2 wherein said shift register means is connected to receive said pulse train with a pulse width ΔT=T/N and for receiving a shift clock signal having a period greater than or equal to T/N.

6. In a power supply of a digital magnetic recording apparatus for recording a plurality of input signals from a plurality of input channels on a plurality of corresponding channels of a recording medium, an arrangement for providing recording power to a plurality of N-recording heads at a current level substantially equal to or less than the current required by a single recording head, comprising:
   first means for providing power to each of said plurality of recording heads as separate sequences of pulses representing input signals from a corresponding input channel;
   second means for timing said sequences of pulses to avoid overlaps between pulse elements of one sequence provided to one of said recording heads and pulse elements of another sequence provided to another of said recording heads;
   said second means thereby operable for providing power to said N-recording heads as N-sequences of non-overlapping current pulse trains;
   whereby N-recording heads are driven by a single power supply capable of providing only sufficient current to operate a single recording head.

7. Power supply apparatus as recited in claim 6 wherein said second means comprises delay means for delaying various pulses in said sequences of pulses by predetermined amounts so as to provide sequences of pulses none of which pulses overlap one another.

8. Power supply apparatus as recited in claim 6 wherein said second means comprises at least N−1 delay means for producing N sequences of pulses at predetermined phases relative to one another, said delay means operable for arranging the sequences of pulses so that no pulse in any sequence overlaps a pulse in any other of the sequences.

9. Power supply apparatus as recited in claim 8 wherein said second means further comprises means for delaying the $j^{th}$ pulse sequence (j between 1 and N−1) by at least jT/N where T is the period of the pulse sequences.

10. Power supply apparatus as recited in claim 8 further comprising modulating means for modulating by using a detection window $T_w$ the signals to be recorded by said plurality of recording heads, wherein said second means further comprises means for delaying the $J^{th}$ pulse train (j between 1 and N−1) by at most $jT_w/N$ where T is the period of the pulse train.

11. Power supply apparatus as recited in claim 9 further comprising modulating means for modulating by using a detection window $T_w$ the signals to be recorded by said plurality of recording heads, wherein said second means further comprises means for delyaing the $j^{th}$ pulse train (j between 1 and N−1) by at most $jT_w/N$ where T is the period of the pulse train.

12. Power supply apparatus as recited in claim 8 further comprising modulating means for modulating by using a detection window $T_w$ the signals to be recorded by said plurality of recording heads, wherein said second means further comprises means delaying the $J^{th}$ pulse train (j between 1 and N−1) by at most $jT_w/2N$ where T is the period of the pulse train.

13. Power supply apparatus as recited in claim 9 further comprising modulating means for modulating by using a detection window $T_w$ the signals to be recorded by said plurality of recording heads, wherein said second means further comprises means for delaying the $j^{th}$ pulse train (j between 1 and N−1) by at most $jT_w/2N$ where T is the period of the pulse train.

14. Power supply apparatus as recited in claim 8 further comprising modulating means for modulating by using a detection window $T_w$ the signals to be recorded by said plurality of recording heads, wherein said second means further comprises means for delaying the $j^{th}$ pulse train (j between 1 and N−1) by at most $jT_w/4N$ where T is the period of the pulse train.

15. Power supply apparatus as recited in claim 9 further comprising modulating means for modulating by using a detection window $T_w$ the signals to be recorded by said plurality of recording heads, wherein said second means further comprises means for delaying the $j^{th}$ pulse train (j between 1 and N−1) by at most $jT_w/4N$ where T is the period of the pulse train.

16. Power supply apparatus as recited in claim 9 wherein said sequence of pulses comprise pulses having a duration defined by T/N.

17. A multichannel digital mangetic recording apparatus for writing multichannel digital signals in multichannels on a magnetic recording medium, the signal written in each channel represented by a train of current pulse elements having a pulse width and a pulse period selected such that when each of said trains of current pulse elements is recorded on said magnetic recording medium each such train is recorded to represent a single digital signal data pulse, said apparatus comprising:

- a plurality of thin film magnetic heads for writing signals in said recording medium,
- a power supply for supplying current to said heads, and means for reducing current requirements from said power supply, including:
    - a plurality of modulating means for modulating said digital signals to provide modulated signals in the form of said trains of pulse elements,
    - a plurality of input means for providing said multichannel digital signals to respective ones of said modulating means, and
    - a plurality of converting means coupled to said modulating means for converting each of said modulated signals into said trains of current pulse elements, each of said digital data pulses represented by a train of current pulse elements, and
- a plurality of delaying means coupled to said converting means and to said thin film magnetic heads, respectively, for delaying said current pulse elements and for providing the delayed outputs to said thin film magnetic heads, thereby to provide power to said plurality of thin film magnetic heads as a plurality of sequences of non-overlapping current pulse elements, whereby said plurality of thin film magnetic heads may be driven by a single power supply capable of providing only sufficient current to operate a single recording head.

* * * * *